Patented Apr. 30, 1940

2,198,665

UNITED STATES PATENT OFFICE 2,198,665

MIXED ACETATE BUTYRATE ESTER OF A POLYGLYCOL

Walter E. Gloor, South River, N. J., assignor to Hercules Powder Company, Wilmington, Del., a corporation of Delaware No Drawing. Application June 4, 1937, Serial No. 146,492

10 Claims. (Cl. 260—488)

This invention relates to a composition of matter comprising a film-forming material and a mixed acetate-butyrate ester of a polyglycol.

As is well known, the plasticizer used in a protective coating or plastic composition has a marked influence on its utility in service. Difficulty has heretofore been experienced in producing protective coatings and plastics having satisfactory properties at normal temperatures, and at the same time a high resistance to embrittlement at low temperatures.

It is the object of this invention to provide a composition of matter suitable for use as a plastic or a protective coating, which is highly resistant to impact at low temperatures and which, at the same time, has improved resistance to cold flow, low moisture permeability and high resistance to sweating.

The composition in accordance with this invention comprises a mixed acetate-butyrate ester of a polyglycol and a film-forming material. The acetate-butyrate ester of a polyglycol which I may use is an ester in which one of the two hydroxyl groups of a polyglycol is esterified with acetic acid, while the other is esterified with butyric acid. The polyglycol so esterified may be, for example, diethylene glycol, triethylene glycol, tetraethylene glycol, dipropylene glycol, etc.

The film-forming material which I may use may be, for example, a cellulose ester, as, cellulose acetate, cellulose nitrate, etc.; a mixed cellulose ester, as, cellulose acetopropionate, cellulose aceto-butyrate, etc.; a cellulose ether, as, ethyl cellulose, benzyl cellulose, etc.; a chlorine-containing rubber derivative, as, chlorinated rubber, rubber hydrochloride, chlorinated rubber hydrochloride, etc.

The relative proportions of the mixed acetate-butyrate ester of a polyglycol and the film-forming material used in the composition in accordance with this invention, will depend upon the particular film-forming material and the particular acetate-butyrate ester of a polyglycol used therein, and upon the purpose for which the composition is to be used. Generally, I prefer to use compositions within the range of about 5 parts to about 75 parts by weight of the mixed ester acetate-butyrate ester of a polyglycol to 100 parts by weight of the film-forming material.

The compositions in accordance with this invention are particularly valuable when the film-forming material used is cellulose acetate. Such compositions are true plastics which are readily worked by the usual methods for working plastics, and the products are of unusual clarity and toughness. Furthermore, these plastic product compositions are resistant to cold flow, resistant to sweating out of the plasticizer and to brittleness at temperatures at which other plastic compositions tend to become brittle. These plastic products are, likewise, characterized by high water-resistance, and by permanence of dimension.

Compositions of cellulose acetate and a mixed acetate-butyrate ester of a polyglycol are also particularly useful in the form of films for the lamination of safety glass, and it will be found that such laminations are less prone to lose strength as the temperature drops than commercial laminae. Certain of these laminations also have the property of becoming stronger as the temperature drops. This property is of great importance in laminated glass for automobiles used in cold climates.

The acetate-butyrate esters of the polyglycol used in the compositions in accordance with this invention may be prepared by the esterification of one of the hydroxyl groups of a polyglycol with butyric acid, and then esterifying the other with acetic acid.

The esterification reaction may advantageously be carried out at an elevated temperature, as, for example, the reflux temperature of the reaction mixture and in the presence of a solvent for the reactants which is inert to the reaction, as, for example, toluol, xylol, etc. The reaction will advantageously be carried out in the presence of an esterification catalyst, such as, for example, p-toluene sulfonic acid, benzene sulfonic acid, sulfuric acid, phosphoric acid, zinc chloride, etc.

The examples which follow illustrate specific procedures for the preparation of these compounds.

EXAMPLE I

*Diethylene glycol acetate-butyrate*

One hundred and six parts by weight of diethylene glycol, 100 parts toluol, 90 parts butyric acid (100% grade) and 5 parts by weight of p-toluene sulfonic acid were heated in a reflux apparatus equipped with a moisture removal tube, until 19 parts by weight of water were removed. The reaction mixture was then cooled to prevent excessive volatization, and 62 parts by weight of glacial acetic acid were introduced into the reaction mixture and the heating continued until an additional 19 parts by weight of water were collected. The excess acid and the solvent (toluol) were removed by distillation under reduced pressure, and the product collected by vacuum fractionation. The product collected at 140° to 165° C. at 5 mm. pressure, has a refractive index of 1.433, a density of 1.05–1.06 at 25° C., saponification No. 477 found (513 theoretical) and is recovered in yields of 80–90% of theoretical. The formula of the product is believed to be as follows:

$$CH_3-COOC_2H_4-O-C_2H_4-OOC-C_3H_7$$

That this material is a definite chemical compound is shown by the fact that it is soluble only to the extent of 16% in water, whereas a 50–50 mixture of the diacetate and di-butyrate would be soluble to an extent of more than 50%, since the diacetate is known to be completely soluble in water (Doolittle, Ind. Eng. Chem. 27, 1169 1935).

EXAMPLE II

*Triethylene glycol acetate-butyrate*

One hundred and fifty parts by weight of triethylene glycol were substituted for the 106 parts by weight of diethylene glycol in Example I, and the procedure outlined in Example I followed.

The product was obtained in a yield of 65–75% of the theoretical. It had a boiling point of 170–185° C. at 10 mm. pressure, a density of 1.06, and a refractive index of 1.438. It is believed to have a formula as follows:

$$CH_3-COOC_2H_4-O-C_2H_4-O-C_2H_4-OOC-C_3H_7$$

EXAMPLE III

*Diethylene glycol acetate-isobutyrate*

One hundred parts by weight of isobutyric acid and 66 parts by weight of acetic acid were substituted for the butyric acid and the acetic acid used in Example I, and the procedure outlined in that example followed.

The product had a boiling range of 130–142° C. at 8 mm. pressure, a density of 1.03 and a refractive index of 1.429. It is believed to have a formula as follows:

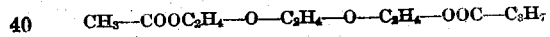

$$CH_3COOC_2H_4-O-C_2H_4-OOC-CH\begin{smallmatrix}CH_3\\CH_3\end{smallmatrix}$$

Compositions in accordance with this invention, suitable for use as molding plastics, are further illustrated by the formulae given in the following table in parts by weight:

Table I

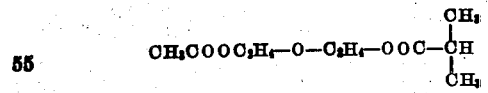

|  | (1) | (2) | (3) |
| --- | --- | --- | --- |
| Cellulose acetate (53% acetic acid) | 64 |  |  |
| Cellulose acetate (52% acetic acid) |  | 64 | 64 |
| Triethylene glycol acetate-butyrate | 36 | 24 |  |
| Diethylene glycol acetate-butyrate |  |  | 26 |
| Triphenyl phosphate |  | 12 | 10 |

Plastics may be prepared from the above compositions by colloiding the composition, as, for example, with the aid of a mixture of equal parts by weight of acetone and alcohol on a differential two-roll mill. The plastic so produced may be sheeted and then molded into any desired form, and will be found to be tough, water-resistant, well bonded and of good clarity.

The properties of the compositions in accordance with this invention for use in compression molding are further illustrated by the following table in parts by weight:

Table II

| Formula | 16 | 17 |
| --- | --- | --- |
| Cellulose acetate (53% acetic acid) | 70 | 72 |
| Triphenyl phosphate | 4 |  |
| Diethylene glycol acetate-butyrate | 26 | 28 |
| Colloid, roll and mold by known methods. |  |  |
| Heat deflection temp. (A. S. T. M. std. test bar) ° C. | 64 | 74 |
| Impact tests: |  |  |
|   Charpy, ft. lb./in. of notch | 1.0 | 1.0 |
|   Izod., ft. lb./in. of notch | 1.3 | 1.6 |
| Water absorption, percent (A. S. T. M. disc) | 3.9 | 4.2 |

The heat deflection temperatures given in the above table are high for plastics of this type. The usual cellulose acetate plastic shows a heat deflection temperature of less than 60° C. The comparatively high heat deflection temperatures shown by the plastics in accordance with this invention indicate excellent resistance of the plastic to cold flow, with resulting deformation and loss of shape.

A composition in accordance with this invention suitable for casting films for general use is illustrated by the following formula:

| | Parts by weight |
| --- | --- |
| Cellulose acetate | 10 |
| Triethylene glycol acetate-butyrate | 2.5 |
| Acetone | 37.5 |
| Ethylene dichloride | 37.5 |
| Ethylene glycol monomethyl ether acetate | 12.5 |

A film 0.002 inch thick was cast from the above solution, seasoned a week, and the properties determined as follows:

Schopper fold test _____ 42
Moisture permeability
    $(K=Gm/Cm/Cm^2/hr)$ _ $6.7 \times 10^{-6}$ A film 0.022 inch thick was cast from a composition as follows:

| | Parts by weight |
| --- | --- |
| Cellulose acetate (52.5% acetic acid) | 50 |
| Triethylene glycol acetate-butyrate | 36 |
| Dimethyl phthalate | 21 |
| Acetone | 100 |
| Ethyl alcohol | 18 |
| Ethylene dichloride | 90 |
| Monomethyl ether of ethylene glycol | 75 |

This film was laminated into 6″ x 6″ test squares of safety glass. These squares of safety glass were then tested for shattering by determining the height of fall required for shattering by a 350 gm. bar with a ¾″ diameter steel ball point. The results of these tests follow:

| | Inches |
| --- | --- |
| At 34° F. | 18 |
| At −4° F. | 27 |

These results demonstrate that the safety glass had a greater resistance to shattering at −4° F. than at 34° F. This is a very unusual and valuable property, since the strength of safety glass made with the previously described cellulose acetate plastics drops sharply with decreased temperatures.

It will be understood that the details and examples hereinbefore set forth are illustrative only, and that the invention as herein broadly described and claimed is in no way limited thereby.

This application is a continuation-in-part of my application Serial No. 114,232, filed December 14, 1936, which has matured into Patent No. 2,136,499.

What I claim and desire to protect by Letters Patent is:

1. A mixed acetate-butyrate ester of a polyglycol.

2. A mixed acetate-butyrate ester of diethylene glycol.

3. A mixed acetate-butyrate ester of triethylene glycol.

4. A mixed acetate-butyrate ester of tetraethylene glycol.

5. A method for the production of a mixed acetate-butyrate ester of a polyglycol which comprises reacting a hydroxyl group of a polyglycol with butyric acid and then reacting the other hydroxyl group with acetic acid.

6. A method for the production of a mixed acetate-butyrate ester of a polyglycol which comprises reacting a hydroxyl group of a polyglycol with butyric acid at an elevated temperature and then reacting the other hydroxyl group with acetic acid at an elevated temperature.

7. A method for the production of a mixed acetate-butyrate ester of a polyglycol which comprises reacting a hydroxyl group of a polyglycol with butyric acid at an elevated temperature in the presence of an esterification catalyst and then reacting the other hydroxyl group with acetic acid at an elevated temperature in the presence of an esterification catalyst.

8. A method for the production of a mixed acetate-butyrate ester of a polyglycol which comprises reacting a hydroxyl group of a polyglycol with butyric acid at an elevated temperature in the presence of p-toluene sulfonic acid and then reacting the other hydroxyl group with acetic acid at an elevated temperature in the presence of p-toluene sulfonic acid.

9. A method for the production of a mixed acetate-butyrate ester of a polyglycol which comprises reacting a hydroxyl group of a polyglycol with butyric acid in the presence of an esterification catalyst and of an inert solvent and then reacting the other hydroxyl group with acetic acid in the presence of an esterification catalyst and of an inert solvent.

10. A method for the production of a mixed acetate-butyrate ester of a polyglycol which comprises reacting a hydroxyl group of a polyglycol with butyric acid in the presence of an esterification catalyst and of toluol and then reacting the other hydroxyl group with acetic acid in the presence of an esterification catalyst and of toluol.

WALTER E. GLOOR.